(12) United States Patent
Lee

(10) Patent No.: US 11,178,887 B2
(45) Date of Patent: Nov. 23, 2021

(54) LAVER SNACK INCLUDING HEMP SEED POWDER AND HEMP OIL, AND MANUFACTURING METHOD AND APPARATUS THEREOF

(71) Applicant: Young-Kee Lee, Seoul (KR)

(72) Inventor: Young-Kee Lee, Seoul (KR)

( * ) Notice: Subject to any disclaimer, the term of this patent is extended or adjusted under 35 U.S.C. 154(b) by 0 days.

(21) Appl. No.: 16/659,590

(22) Filed: Oct. 22, 2019

(65) Prior Publication Data

US 2020/0390124 A1    Dec. 17, 2020

(30) Foreign Application Priority Data

Jun. 13, 2019  (KR) .......................... 10-2019-0069901

(51) Int. Cl.
| | |
|---|---|
| *A23G 3/50* | (2006.01) |
| *A23P 20/10* | (2016.01) |
| *A23G 3/48* | (2006.01) |
| *A23L 17/60* | (2016.01) |

(52) U.S. Cl.
CPC ................. *A23G 3/50* (2013.01); *A23G 3/48* (2013.01); *A23L 17/60* (2016.08); *A23P 20/11* (2016.08)

(58) Field of Classification Search
CPC .. A23G 3/48; A23G 3/50; A23L 17/60; A23P 20/11
USPC .......................................................... 426/573
See application file for complete search history.

(56) References Cited

U.S. PATENT DOCUMENTS

2014/0170291 A1* 6/2014 Chung ....................... A23L 7/13
426/560

FOREIGN PATENT DOCUMENTS

| KR | 101844849 B1 * | 4/2018 | |
| WO | WO-2017202935 A1 * | 11/2017 | .............. A61P 25/24 |

OTHER PUBLICATIONS

Laurie Sadowski, Sweet Thai Nori Crisps: from laurisadowski.com; post of Feb. 1, 2013—3 pages (Year: 2013).*

* cited by examiner

*Primary Examiner* — Jyoti Chawla
(74) *Attorney, Agent, or Firm* — Revolution IP, PLLC

(57) ABSTRACT

A laver snack includes laver on the lower side forming a bottom; the edible adhesive applied to the laver on the lower side; the additive including hemp seed powder adhered to the edible adhesive; the laver on the upper side covering the above additives, forming a top; and hemp oil applied to the laver on the upper side.

6 Claims, 6 Drawing Sheets

[FIG. 1]
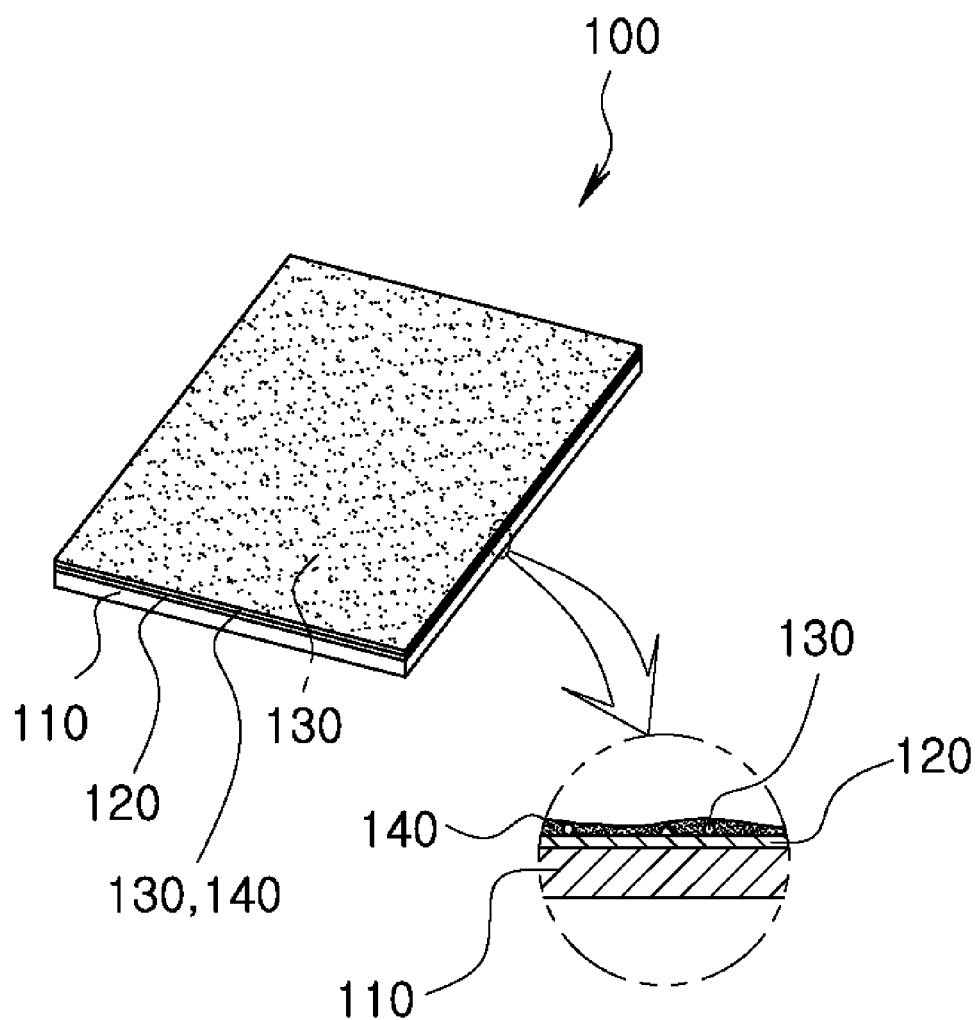

[FIG. 2]
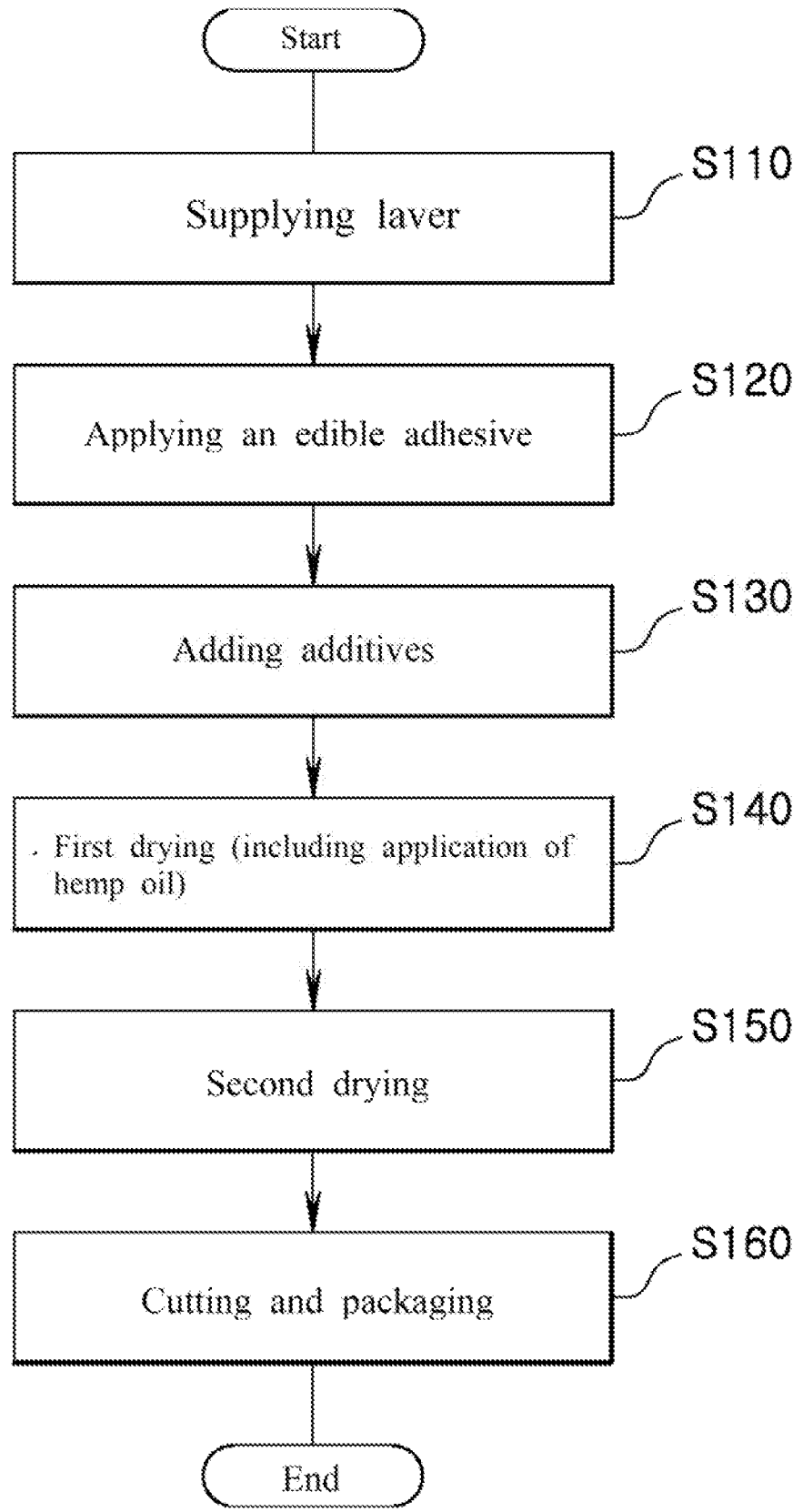

[FIG. 3]
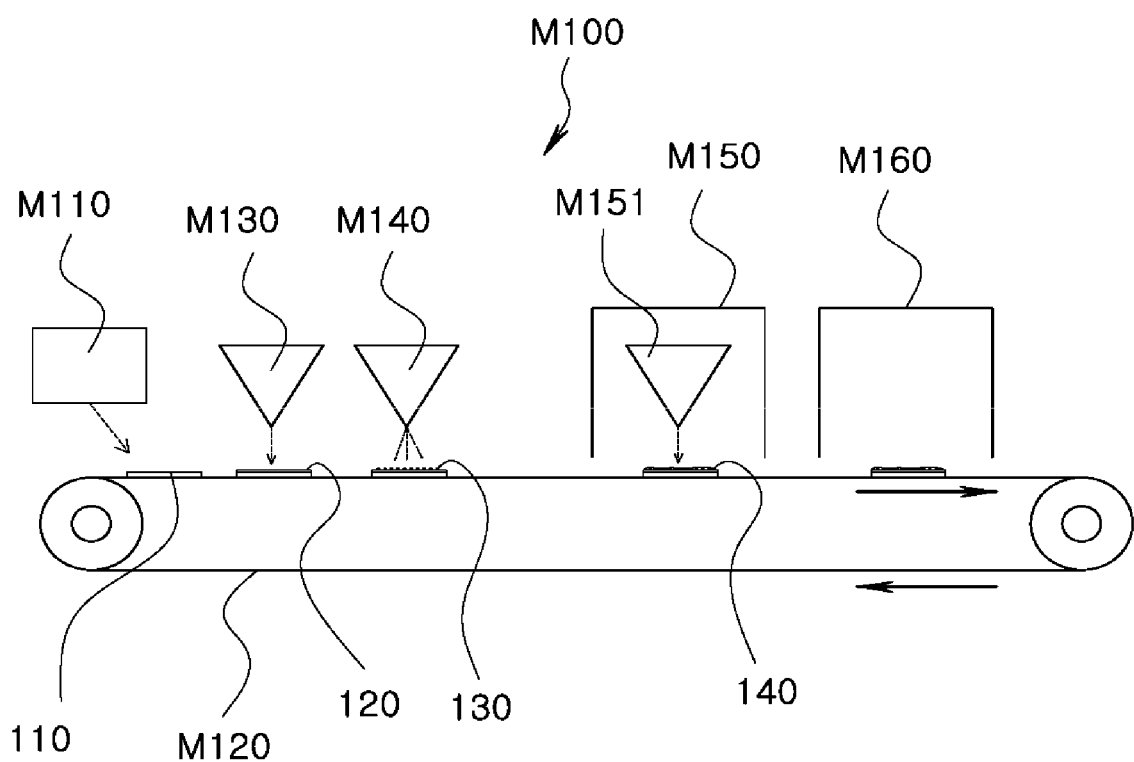

[FIG. 4]
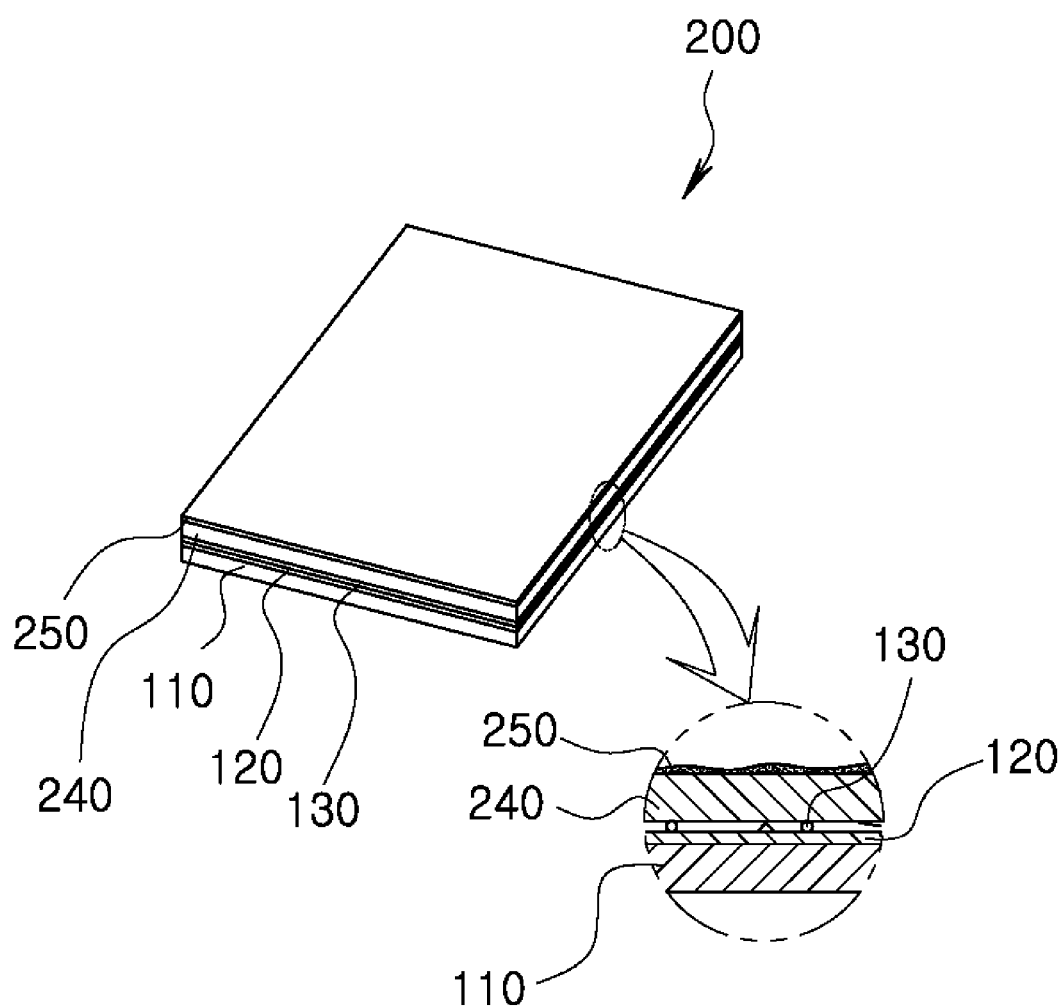

[FIG. 5]
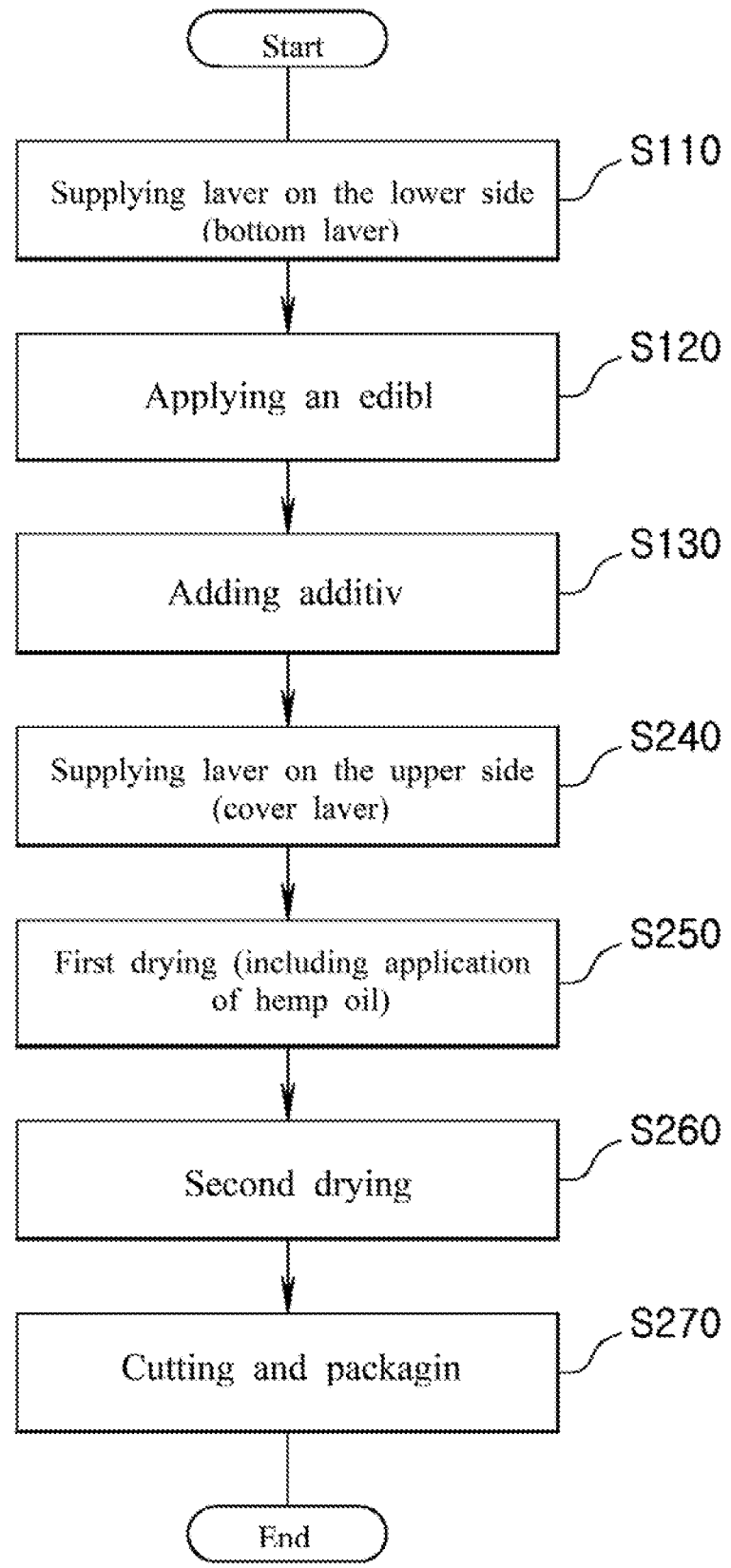

[FIG. 6]
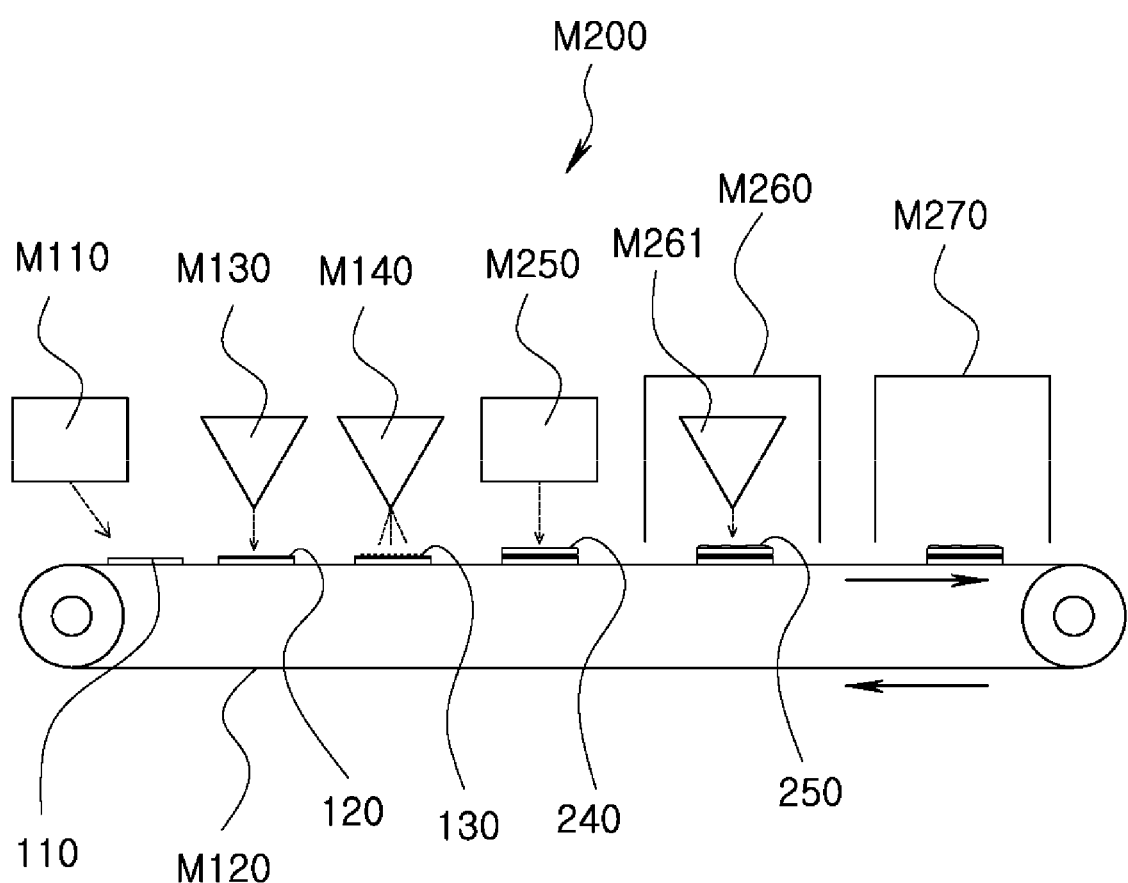

LAVER SNACK INCLUDING HEMP SEED POWDER AND HEMP OIL, AND MANUFACTURING METHOD AND APPARATUS THEREOF

TECHNICAL FIELD

The present invention relates to laver.

TECHNICAL BACKGROUND OF THE INVENTION

Generally, laver is also known as "green laver" and "purple laver", is a seaweed from the family Bangiaceae and order Bangiales in the division Rhodophyta.

Laver not only contains high-quality protein and fibre, and nutrients such as minerals and vitamins that are essential to our bodies but are easily deficient, but also it is the strongest alkaline food among foods, and is known as an ideal health food that provides nutritional balance to modern people who have low calories and severe calorie intake and nutritional imbalance.

Furthermore, laver is one of the most preferred foods among seaweeds because of its taste and aroma. In addition to being used as the main material for Gimbap (Dried Seaweed Rolls), crushed laver is used as a garnish of Dumpling Soup, noodles, Udon, porridge, etc. It is also widely used to make fried rice, Bibimbap and riceballs. Thus, laver is attracting attention as a food rich in nutrients.

However, since the existing laver is simply dried and provided, there is a problem that it does not meet the taste of health-oriented consumers.

SUMMARY OF THE INVENTION

Technical Problem

An object of the present invention is to provide a laver snack which improves texture and nutritional properties remarkably and is always enjoyed as a snack and eatables other than use as a side dish, and can satisfy the tastes of health-oriented consumers including improving the heart and cardiovascular functions by adding omega-3, 6, and 9 ingredients, Essential Fatty Acids of hemp oil, and a manufacturing method and apparatus thereof.

Another object of the present invention is to provide the seasoned laver that is dried at temperatures below the smoke point after hemp oil is applied to prevent the formation of obnoxious odours and harmful ingredients due to the denaturation of oil at high temperatures and its manufacturing apparatus.

An object of the present invention is to provide a laver snack that has a unique savour and flavour, can enhance the taste with dry flakes, such as dried anchovies, dried shrimp, etc., and can improve nutrition by the addition of hemp seed powder and hemp oil, and its manufacturing apparatus.

The object of the present invention is not limited to the above-mentioned objects, and other objects not mentioned will be clearly understood by any person skilled in the relevant field of technology from the following description.

Means for Solving Problems

To achieve the above objects, the laver snack according to an embodiment of the present invention includes laver on the lower side forming a bottom; an edible adhesive applied to the laver on the lower side; an additive including hemp seed powder adhered to the edible adhesive; and hemp oil applied on the edible adhesive and the additive.

Meanwhile, the laver snack according to another embodiment of the present invention includes laver on the lower side forming a bottom; the edible adhesive applied to the laver on the lower side; the additive including hemp seed powder adhered to the edible adhesive; laver on the upper side covering the above additives, forming a top; and hemp oil applied to the laver on the upper side.

On the one hand, a manufacturing method of the laver snack according to another embodiment of the present invention includes the steps of: supplying laver on the lower side to form a bottom of the laver snack; applying an edible adhesive to the supplied laver on the lower side; sprinkling an additive including hemp seed powder on the applied edible adhesive; first drying by applying heat while applying the hemp oil to the laver on the lower side on which the additive is sprinkled to achieve semi-drying; and second drying to apply heat after semi-drying to complete drying.

On the other hand, a manufacturing method of the laver snack according to another embodiment of the present invention includes the steps of: supplying laver on the lower side to form a bottom of the laver snack; applying an edible adhesive to the supplied laver on the lower side; sprinkling an additive including hemp seed powder on the applied edible adhesive; supplying the laver on the upper side so as to cover the laver on the lower side on which the additive is sprinkled; first drying by applying heat while applying the hemp oil to the laver on the lower side which is supplied to achieve semi-drying; and second drying to apply heat after semi-drying to complete drying.

Each of the manufacturing methods of laver snack according to another embodiment of the present invention described above may further include the step of preparing the edible adhesive simultaneously, before or after the step of supplying the laver on the lower side, and the step of preparing the edible adhesive may include the steps of: making broth; adding grain flour to the made broth; and boiling the broth to which the grain flour is added.

In the step of making the broth, by adding anchovy 40 g, dried shrimp 15 g, radish 65 g, leek 15 g, garlic 15 g, dried red pepper 5 g, dried shiitake mushroom 15 g, kelp 20 g, onion 30 g, to 1 litre of water, by boiling and simmering it, the broth can be made. In the step of adding the grain flour, to 1 litre of the above-made broth, grain flour mixed with glutinous rice flour and brown rice flour in a ratio of 5:5, may be added in a ratio of 250 g.

The first drying step may be heated in a temperature range of 35° C. to 50° C.

The second drying step may be heated in a temperature range of 50° C. to 80° C.

In the step of sprinkling the additive, the additive may be sprinkled evenly, and may further include peanut powder, sesame seeds, and dried anchovy.

On the other hand, the manufacturing apparatus of the laver snack according to another embodiment of the present invention includes: a laver feeder on the lower side continuously supplying the laver on the lower side forming the bottom of the laver snack; a conveyor for conveying the continuously supplied laver on the lower side; an adhesive applicator for applying an edible adhesive to the conveyed laver on the lower side; an hopper for additives positioned next to the adhesive applicator with respect to the conveying direction and sprinkling an additive including hemp seed powder on a laver on the lower side to which the adhesive is applied; a first dryer having a built-in hemp oil applicator positioned next to the hopper for additives with respect to the conveying direction and applying heat while applying the hemp oil to the laver on the lower side where the additive is sprinkled, so that semi-drying is achieved; a second dryer positioned after the first dryer with respect to the conveying direction, and applying heat to the semi-dried laver on the lower side to allow complete drying.

On the other hand, the manufacturing apparatus of the laver snack according to another embodiment of the present invention may further include: a laver feeder on the lower side continuously supplying the laver on the lower side forming the bottom of the laver snack; a conveyor for conveying the continuously supplied laver on the lower side; an adhesive applicator for applying an edible adhesive to the conveyed laver on the lower side; a hopper for additives positioned next to the adhesive applicator with respect to the conveying direction and sprinkling an additive including hemp seed powder on a laver on the lower side to which the adhesive is applied; a laver feeder on the upper side, which is positioned next to the hopper for additives and continually supplies the laver on the upper side of the laver snack so as to cover the laver on the lower side on which the additive is sprinkled; a first dryer with a built-in hemp oil applicator, which is positioned next to the laver feeder on the upper side and applies heat to the laver on the upper side while applying the hamp oil to perform semi-drying; a second dryer positioned after the first dryer with respect to the conveying direction, and applying heat to the semi-dried laver on the lower side and upper side to allow complete drying.

Effects of the Invention

As described above, the laver snack and the manufacturing method and apparatus thereof, according to the embodiments of the present invention may have the following effects.

According to embodiments of the present invention, since it provides a technical element comprising laver on the lower side (bottom laver), edible adhesives and an additive including hemp seed powder, and hemp oil, the texture and nutrition are remarkably improved and it can be enjoyed as snacks or eatables in addition to its use as a side dish, and omega-3, 6, and 9 ingredients Essential Fatty Acids of hemp oil may be added to the laver. In this way, health-oriented functionality that plays a key role in maintaining and activating the body's function, such as improving heart and cardiovascular function, can be reinforced. In particular, hemp oil includes minerals such as calcium, iron, magnesium, manganese, phosphorus, potassium, zinc and vitamins B1, B2, B3, B6, D and E, and phytosterol of hemp oil can reduce total serum cholesterol by an average of 10% and reduce bad LDL cholesterol by an average of 13%. Further, hemp oil includes 9 essential amino acids and 18 amino acids, GLA (γ-linolenic acid), vitamins, minerals and dietary fibre. Aarginine, which helps fat burning and vasodilation, is also included four times as much as eel and 15 times as much as salmon, and many degenerative diseases due to aging can be prevented by taking the laver snack of the present invention. Further, hemp oil has been known to have anticancer and antioxidant properties, and is rich in tocopherol, an antioxidant known to be effective in arteriosclerosis and phytol, as well as in Alzheimer's. Therefore, the laver snack of the present invention can play a sufficient role as a functional food which can have nutritional significance and physiological effects in favour of diseases and prevention.

Further, according to embodiments of the present invention, since the additive provides a technical element further comprising peanut powder, sesame seeds, and dried anchovy, there is a unique savour and flavour of the laver, in addition to peanut powder and sesame seeds, dry flakes such as dried anchovy can enhance the taste and nutrition and minimize destruction of nutrients.

Further, according to another embodiment of the present invention, since the technical element for heating in the temperature range of 50° C. to 80° C. for second drying after the application of the hemp oil, roasting may proceed at a temperature below the smoke point of the hemp oil, thereby preventing the formation of obnoxious odours and harmful ingredients due to the denaturation of oil at high temperatures.

Further, according to another embodiment of the present invention, the edible adhesive made by adding rice glutinous flour and brown rice powder to broth is applied to the surface of the seaweed, on the surface of the edible adhesive, peanut powder, sesame seeds, and dried anchovy, dried shrimp and hemp seed flour are sprinkled; then, on top of it, another laver on the upper side, while attached, hemp oil is applied, roasted and manufactured in snack form, which significantly improves the texture and nutrition; in addition to its use as a side dish, it can always be enjoyed as a snack or eatable, satisfies the health-minded consumers of laver snacks, and can maintain the shelf life of products.

Further, according to embodiments of the present invention, not limited to the above-mentioned effects, other effects that are not mentioned will be clearly understood by the person skilled in the relevant field of technology from the following description.

BRIEF DESCRIPTION OF DRAWINGS

FIG. 1 is a view schematically showing the laver snack according to the first embodiment of the present invention.

FIG. 2 is a flowchart schematically illustrating the manufacturing method of the laver snack of FIG. 1.

FIG. 3 is a view schematically showing the manufacturing apparatus of the laver snack of FIG. 1.

FIG. 4 is a view schematically showing the laver snack according to the second embodiment of the present invention.

FIG. 5 is a flowchart schematically illustrating the manufacturing method of the laver snack of FIG. 1.

FIG. 6 is a view schematically showing the manufacturing apparatus of the laver snack of FIG. 1.

DETAILED DESCRIPTION OF THE PREFERRED EMBODIMENT

Hereinafter, embodiments of the present invention will be described in detail with reference to the accompanying drawings so that a person skilled in the art may easily execute the present invention. However, the invention can be executed in various different forms and is not limited to the embodiments described herein.

FIG. 1 is a view schematically showing the laver snack according to the first embodiment of the present invention, FIG. is a flowchart schematically illustrating the manufacturing method of the laver snack of FIG. 1. FIG. 3 is a view schematically showing the manufacturing apparatus of the laver snack of FIG. 1.

As shown in FIGS. 1 to 3, the laver snack 100 according to the first embodiment of the present invention includes a laver on the lower side (bottom laver) 110, an edible adhesive 120, an additive 130 and hemp oil 140. Hereinafter, each element will be described in detail with reference to FIGS. 1 to 3.

The laver on the lower side 110 is an element forming the bottom of the laver snack 100 of the present invention, as shown in FIG. 1. This laver on the lower side 110 can be a dry raw laver by cutting raw material of the gathered laver into a set size, washing the raw material of the cutted laver to manufacture the raw laver, dehydrating the washed raw laver, and drying the dehydrated raw laver. Of course, the laver on the lower side 110 may be roasted laver with heat source applied to dry laver.

The edible adhesive 120, as shown in FIG. 1, is an element for attaching the additive 130 to the laver on the lower side 110. The edible adhesive 120, as shown in FIGS. 2 and 3, may be applied to the laver on the lower side 110 through the adhesive applicator (M13 of FIG. 3). Specifically, the edible adhesive 120 may be made by making a broth, adding grain flour to the broth made, and boiling the broth to which the grain flour is added.

Here, the process of making the broth is by adding anchovy 40 g, dried shrimp 15 g, radish 65 g, leek 15 g, garlic 15 g, dried red pepper 5 g, dried shiitake mushroom 15 g, kelp 20 g, onion 30 g, to 1 litre of water, by boiling and simmering it, the broth can be made. And, the process of adding the grain flour, to 1 litre of the above-made broth, grain flour mixed with glutinous rice flour and brown rice flour in a ratio of 5:5, may be added in a ratio of 250 g.

The additive 130 is an element for enhancing taste and nutrition. The additive 130 may be adhered to the laver on the lower side 110 through an edible adhesive 120 as shown in FIG. 1. In addition, the additive 130 may include hemp seed powder. Therefore, the texture and nutritional properties are remarkably improved, and it can always be enjoyed as a snack or eatable in addition to its use as a side dish.

Further, although not shown, the additive 130 may further include peanut powder, sesame seeds, and dried anchovy etc. Thus, there is a unique savour and flavour, and in addition to peanut powder and sesame seeds, dry flakes such as dried anchovy can enhance the taste and nutrition and minimize the destruction of nutrients.

Hemp oil 140 is an element for providing consumers with health-oriented functionality that plays a key role in maintaining and activating the immune system of the body. The hemp oil 140, as shown in FIG. 1, may be applied on the edible adhesive 120 and the additive 130.

Therefore, since the above elements are provided, in addition to its use as a side dish, it can always be enjoyed as a snack or eatable, omega-3, 6, and 9 ingredients Essential Fatty Acids of hemp oil [Oil extracted from raw hemp seed at 40° C. or lower by cold pressed technique without roasting] may be added to the laver. In this way, health-oriented functionality that plays a key role in maintaining and activating the body's function, such as improving heart and cardiovascular function, can be reinforced. In particular, hemp oil 140 includes minerals such as calcium, iron, magnesium, manganese, phosphorus, potassium, zinc and vitamins B1, B2, B3, B6, D and E, and phytosterol of hemp oil 140 can reduce total serum cholesterol by an average of 10% and reduce bad LDL cholesterol by an average of 13%. Further, hemp oil 140 includes 9 essential amino acids and 18 amino acids, GLA (γ-linolenic acid), vitamins, minerals and dietary fibre. Aarginine, which helps fat burning and vasodilation, is also included four times as much as eel and 15 times as much as salmon, and many degenerative diseases due to aging can be prevented by taking the laver snack of the present invention. Further, hemp oil 140 has been known to have anti-cancer and antioxidant properties, and is rich in tocopherol, an antioxidant known to be effective in arteriosclerosis and phytol, as well as in Alzheimer's. Therefore, the laver snack of the present invention can play a sufficient role as a functional food which can have nutritional significance and physiological effects in favour of diseases and prevention.

Hereinafter, referring to FIG. 1 to FIG. 3 continuously, a manufacturing method of the laver snack according to the first embodiment of the present invention will be described.

First, laver on the lower side is supplied S110.

From the laver feeder on the lower side (M110 of FIG. 3), the laver on the lower side (bottom laver) can be continuously supplied one by one to the conveyor (M120 of FIG. 3). Here, the conveyor M120 may be used as a conveyor and the like, the laver on the lower side is supplied on the conveyor belt can be moved with the conveyor belt.

Then, edible adhesive is applied to the laver on the lower side S120.

While the laver on the lower side is conveyed through the conveyor M120 of FIG. 3, the edible adhesive supplied from the adhesive applicator M130 of FIG. 3 may be evenly applied to the surface of the laver on the lower side. In particular, before applying the edible adhesive to the laver on the lower side, the adhesive is prepared.

The process of preparing the adhesive can be carried out simultaneously, before or after the process of supplying the laver on the lower side. The process of preparing the edible adhesive paste may include a process of making broth, adding grain powder to the broth, and boiling the broth to which the grain flour is added.

Further, the process of making the broth is by adding anchovy 40 g, dried shrimp 15 g, radish 65 g, leek 15 g, garlic 15 g, dried red pepper 5 g, dried shiitake mushroom 15 g, kelp 20 g, onion 30 g, to 1 litre of water, by boiling and simmering it, the broth can be made. And, the process of adding the grain flour, to 1 litre of the above-made broth, grain flour mixed with glutinous rice flour and brown rice flour in a ratio of 5:5, may be added in a ratio of 250 g.

After that, the additive is sprinkled S130.

The surface to which the edible adhesive was applied in the laver on the lower side, the additives mixed with peanut powder, sesame seeds and dried anchovy, dried shrimp and hemp seed powder may be evenly supplied and adhered to.

Furthermore, in the process of sprinkling the additive S130, when the laver snack of the present invention is 100% by weight, by adding 0.5 to 2% by weight of salt, seasoning can be added to the laver snack. In addition, by adding 1 to 5% by weight of the dry flakes, including dried anchovy, dried shrimp, etc., it is possible to double the preference of consumers by enhancing the taste and nutrition.

Meanwhile, in the process of sprinkling the additive S130, the additive including salt and dry flakes including dried anchovy, dried shrimp, and hemp seed powder are added to manufacture the laver snack, as an example, but the technical idea of the present invention is not limited to the above example, and in addition to the dry flakes including the additive including salt and dried anchovies, dried shrimp, and hemp seed powder, according to consumers' preferences and manufacturing purposes, the application amount, content, additives, etc. may be variously modified, and these modifications are included in the scope of a right of the technical idea of the present invention.

Then, the first drying process is performed S140.

The first drying process is a process of semi-drying while applying hemp oil. On the surface of the laver on the lower side to which the additive is attached, a heat of 35° C. to 50° C. is applied while applying hemp oil, so that semi-drying is performed simultaneously with the application. Therefore, the applied hemp oil may be semi-dried while permeating the laver on the lower side well by heat, thereby improving the useful ingredient of the hemp oil and the flavour of the laver snack.

Here, the raw hemp seed oil extracted by cold pressing is used as the hemp oil without roasting the raw hemp seed. As the temperature for expressing oil is extracted below 40° C. by cold press technique, useful ingredients in the hemp oil can be protected.

Then, the second drying process is performed S150.

The second drying process S150 is to apply heat after semi-drying to complete drying. In the second drying process S150, the first dried laver on the lower side is completely dry in the temperature range of 50° C. to 80° C. temperature, below the smoke point of the hemp oil, the laver snack of the present invention to be made.

For reference, in the manufacture of a laver snack, in the case of existing technologies for heating oiled laver above the smoke point, carcinogens such as benzopyrene or harmful ingredients to human body, such as trans fats, active oxygen, and peroxides may be produced by denaturation of oil ingredients, and in the present invention, the formation of such harmful ingredients can be prevented.

As a result of the experiment, in the second drying process S150, when the complete drying of the laver snack is less than 50° C. it was confirmed that the complete drying is not made, and when it was performed above 80° C., it was confirmed that heat was further applied in a state where complete drying was achieved, and heat wasted. Therefore, the second drying process S150 is preferably carried out in a temperature range of 50° C. to 80° C.

Finally, the cutting and packaging S160.

Specifically, the cutting and packaging process S160 is a process of cutting the laver snack by a certain unit, then packaging and commercializing. In the cutting and packaging process S160, the element for cutting the laver snack, then packaging and commercializing, may be variously modified according to the purpose of the manufacturer or user, and since the elements of such commercialization are prior art, for convenience and clarity of description of the technical idea of the present invention, a detailed description will be omitted.

Hereinafter, the manufacturing method of seasoned laver according to another embodiment of the present invention will be described in more detail.

Embodiment 1

The broth was manufactured by adding anchovy 40 g, dried shrimp 15 g, radish 65 g, leek 15 g, garlic 15 g, dried red pepper 5 g, dried shiitake mushroom 15 g, kelp 20 g, onion 30 g, to 1 litre of water, by boiling and simmering it. And, the raw material of the laver was washed in 6% salt and purified salt water at a temperature of 43° C., then dehydrated and dried for 30 hours in a shade of 18° C. to manufacture dry raw laver.

From the supply part of the laver on the lower (hereinafter referred to as "laver") on the circulating or rotating conveyor belt, the laver was continuously supplied one by one, and the edible adhesive was applied to the surface of the laver conveyed in the state placed on the conveyor belt to be evenly applied.

The surface to which the edible adhesive was applied in the laver, the additive mixed with peanut powder, sesame seeds and dried anchovy, dried shrimp and hemp seed powder was evenly supplied and adhered to.

In the process of adding nuts and dry flakes to the edible adhesive of the laver by applying 0.5 to 2% by weight of salt to 100% by weight of the seaweed seed applied with the hemp seed powder and hemp oil, and by adding 1 to 5% by weight of dry flakes, including dried anchovy and dried shrimp, the flavour and nutrition were enhanced to improve the taste of the laver, thereby doubling consumers' preference.

The first dried laver snack is completely dry at 50 to 80° C., through a second drying process made of laver snacks, a functional laver snack was manufactured, which has sweet and crispy nutrition.

Embodiment 2

The surface to which the edible adhesive was applied in the laver, the additive mixed with cheese powder, sesame seeds and dried anchovy, dried shrimp and hemp seed powder was evenly supplied and adhered to.

In the process of adding nuts and dry flakes to the edible adhesive of the laver by applying 0.5 to 2% by weight of salt to 100% by weight of the seaweed seed applied with the hemp seed powder and hemp oil, and by adding 1 to 5% by weight of dry flakes, including cheese powder, dried anchovy and dried shrimp, the flavour and nutrition were enhanced to improve the taste of the laver, thereby doubling consumers' preference.

The first dried laver snack is completely dry at 50 to 80° C., through a second drying process made of laver snacks, a functional laver snack was manufactured, which has sweet and crispy nutrition.

Embodiment 3

A combination of Embodiments 1 and 2 was manufactured such that the surface to which the edible adhesive was applied in the laver, the additive mixed with cheese powder, sesame seeds and dried anchovy, dried shrimp and hemp seed powder was evenly supplied and adhered to.

In the Embodiments 1, 2 and 3 jointly, the surface of the laver conveyed with the additives attached to the surface of the laver in the first drying process to be semi-dried at the same time, with the application of the hemp oil at 35° C. to 50° C., it is manufactured to enhance the useful ingredients of oil and flavour of laver snack.

As the temperature for expressing oil is extracted below 40° C. by cold press technique, useful ingredients in the hemp oil can be protected, the hemp oil was added to laver to manufacture the laver snack.

The first dried laver snack is completely dry at 50 to 80° C., through a second drying process made of laver snacks, a functional laver snack was manufactured, which has sweet and crispy nutrition.

Comparative Example 1

Commercially available laver snack (manufactured by S) was prepared. After cutting raw material of laver to the set size, roasted to remove the moisture, and then stir-fried once more with one or more cooking oil, then mixed with the addition of spices, including cheese powder and sugar, the laver snack was manufactured by nitrogen-filled packaging or vacuum packaging by a fixed amount.

Comparative Example 2

Commercially available laver snack (manufactured by C) was prepared. In a broth, a adhesive made from glutinous rice flour, brown rice flour and steamed rice wrapped in a lotus leaf powder is applied to the surface of the laver and sprinkled with nuts and sesame seeds. It was roasted again with another laver on the upper side (cover laver) attached thereon, and manufactured in snack form.

<Sensory Evaluation>

As described above, the sensory evaluation on the taste, savour, preference, etc. of the laver snacks manufactured according to Embodiments 1, 2 and 3 and the laver snacks manufactured according to comparative examples 1 and 2, and the result was shown to the following [Table 2]. Sensory evaluation was conducted on 25 general consumers, and the score and evaluation standard were 9-point scoring method, and are shown in [Table 1] below.

TABLE 1

| Score | Evaluation standard |
|---|---|
| 9 | Excellent |
| 7 | Good |
| 5 | Average |
| 3 | Poor |
| 1 | Terrible |

TABLE 2

| Classification | Taste (flavour) | Savour (smell) | Appearance (colour) | Overall preference |
|---|---|---|---|---|
| Embodiment 1 | 7.8 | 7.6 | 7.5 | 7.6 |
| Embodiment 2 | 7.9 | 7.8 | 7.7 | 7.8 |
| Embodiment 3 | 7.7 | 7.5 | 7.5 | 7.6 |
| Comparative example 1 | 5.2 | 5.1 | 5.0 | 5.1 |
| Comparative example 2 | 7.2 | 7.1 | 7.3 | 7.2 |

As shown in [Table 2], in the results of comparing the taste, savour, appearance and overall preference of the laver snacks manufactured according to the Embodiments 1, 2 and 3 and the laver snacks according to the comparative examples 1 and 2, it was found that the laver snacks manufactured by the Embodiments were superior in overall taste (flavour), savour (smell) and overall preference to the laver snacks according to comparative examples.

This, as in the embodiment, the first dried laver snack is completely dry at 50 to 80° C., through a second drying process made of laver snacks, a functional laver snack was manufactured, which has sweet and crispy nutrition, and by applying hemp oil to the laver, adding salt-containing additives and dried flakes such as dried anchovy and dried shrimp, and adding the hemp seed powder, and drying at a temperature below the smoke point to manufacture a laver snack, it is judged that the flavour of the laver snack can be prevented from being inhibited by the degeneration of oil ingredients at high temperature, and the taste and nutrition of the laver snack are improved by the dry flakes to satisfy consumers' preference.

<Content Analysis of Benzopyrene>

Benzopyrene is a type of polycyclic aromatic hydrocarbon (PAH), which is an environmental hormone that causes various cancers and causes mutations when accumulated in the human body. When the food is cooked or processed at a high temperature, carbohydrates, proteins, fats, and the like, which are the main components of the food, may be produced by incomplete combustion.

The content of benzopyrene was studied by the experimental method announced by the Ministry of Food and Drug Safety, and as a test equipment, high speed liquid chromatography Younglin instrument (MODEL: SP925S) was used as a fluorescent detector, JASCO FP-2020PLUS autosampler as a fluorescent detector. As an internal material, 3-methylcholaterene was used, extracted with N,N-dimethylformamide-water (9:1) and hexane and purified by SPE (Solid Phase Extraction) cartridge; the analysis was performed with the high speed liquid chromatography/fluorescence detector.

TABLE 3

| Classification | Content analysis of benzopyrene (ppb) |
|---|---|
| Embodiment 1 | Non-detection |
| Embodiment 2 | Non-detection |
| Embodiment 3 | Non-detection |
| Comparative example 1 | 2.3 |

Referring to [Table 3], for the seasoned laver manufactured according to Embodiments 1, 2, and 3, benzopyrene was confirmed to be 2.0 ppb or less, the legal standard value. By applying hemp oil to the seaweed, adding salt-containing additives, dried flakes such as dried anchovy and dried shrimp, and adding the hemp seed powder and roasting at a low temperature below the smoke point to manufacture a laver snack, it was found that various foreign substances and benzopyrene, which is a primary carcinogen, have a decreasing effect.

Hereinafter, referring to FIG. 3 continuously, a manufacturing apparatus of the laver snack M100 according to the first embodiment of the present invention will be described.

As shown in FIG. 3, the manufacturing apparatus M100 of laver snack according to the first embodiment of the present invention, includes a laver feeder on the lower side M110; a conveyor M120; an adhesive applicator M130; hopper for additives M140; a first dryer M150; and a second dryer M160. Hereinafter, each element will be described in detail with reference to FIG. 3.

The laver feeder on the lower side M110 is an element for continuously supplying the laver on the lower side 110 forming the bottom of the laver snack, and such a laver feeder on the lower side M110 may be used, such as a robot arm. The conveyer is an element for conveying the laver on the lower side 110 which is continuously supplied, and such a conveyer may be used as a conveyor.

The adhesive applicator M130 is an element to apply the edible adhesive 120 to the laver on the lower side 110 to be transferred, the adhesive applicator M130 may have a brush or the like attached to an end thereof, and the brush may have a structure in which the edible adhesive 120 is supplied. The hopper for additives M140 is an element that sprinkles the additive 130 containing the hemp seed powder in the laver on the lower side 110 to which the edible adhesive 120 is applied, and located next to the applicator M130.

The first dryer M150 is an element to apply the heat while applying the hemp oil 140 to the laver on the lower side 110 to which the additive 130 is sprinkled so that semi-drying is made. The first dryer M150 is located after the additive hopper M140 based on the conveying direction, and may include a hot wire, a blast fan, a hemp oil applicator M151, and the like.

The second dryer M160 is an element to apply heat to the semi-dried laver on the lower side 110 to complete drying. The second dryer M160 is located after the first dryer M150 based on the conveying direction, and may include a hot wire, a blast fan, and the like.

Hereinafter, referring to FIG. 4 and FIG. 6 continuously, a manufacturing method of the laver snack 200 according to the second embodiment of the present invention will be described.

FIG. 4 is a view schematically showing the laver snack according to the second embodiment of the present invention, FIG. 5 is a flowchart schematically illustrating the manufacturing method of the laver snack of FIG. 1, and FIG. 6 is a view schematically showing the manufacturing apparatus of the laver snack of FIG. 1.

The laver snack 200 according to the second embodiment of the present invention, as shown in FIG. 4, except that it further includes the laver on the upper side 240 and the hemp oil 250 is applied to the laver on the upper side 240, since it is the same as the laver snack 100 of the first embodiment of the present invention described above, it will be mainly described below.

The laver on the upper side (cover laver) 240 covers the additive 130 and forms an upper part of the laver snack 200 of the present invention, and the hemp oil 250 is applied to the laver on the upper side 240.

Hereinafter, referring to FIGS. 4 to 6 again, a manufacturing method of laver snack according to the second embodiment of the present invention will be described.

The manufacturing method of the laver snack according to the second embodiment of the present invention, as shown in FIG. 5, except that it further includes a process of supplying the laver on the upper side S240, after which the first drying process S250 and the second drying process S260 proceeds in sequence, since it is the same as the manufacturing method of the first embodiment of the present invention described above, it will be mainly described below.

The process of supplying the laver on the upper side S240 is a process of supplying the laver on the upper side to the laver on the lower side so that the laver on the lower side on which the additive was sprinkled is covered. Then, applying the heat while applying the hemp oil to the supplied laver on the upper side, the first drying process S250 is carried out so that the semi-drying is carried out, the heat is applied after the semi-drying to complete the second drying process S260 is advanced.

Hereinafter, referring to FIG. 4 and FIG. 6 again, a manufacturing apparatus of the laver snack M200 according to the second embodiment of the present invention will be described.

The manufacturing apparatus of the laver snack M200 according to the second embodiment of the present invention, as shown in FIG. 6, except that it further includes a laver feeder on the upper side M250, and the first and second dryers M260 and M270 are sequentially disposed after the laver feeder on the upper side M250 based on the conveying direction, since it is the same as the manufacturing apparatus M100 of the first embodiment of the present invention described above, it will be mainly described below.

The laver feeder on the upper side M250 is located after the hopper for additives M140 with respect to the conveying direction, it continuously supplies the laver on the upper side 240 forming the top of the laver snack 200 so that the laver on the lower side 110 with additives 130 is covered. For example, a robot arm or the like may be used as the laver feeder on the upper side M250.

The first dryer M260 is positioned after the laver feeder on the upper side M250 based on the conveying direction, it has a built-in hemp oil applicator M261 that applies heat to the laver on the upper side 240 while applying the hemp oil 250 to make it semi-dry. The first dryer M260 may include a hot wire, a blast fan, and the like together with the hemp oil applicator M261.

The second dryer M270 is located next to the first dryer M260 based on the conveying direction, the semi-dried laver on the lower side 110 and the laver on the upper side 240 are heated to allow complete drying. The second dryer M270 may include a hot wire, a blast fan.

Although a preferred embodiment of the present invention has been described in detail above, the scope of a right of the present invention is not limited thereto, and many variations and modifications of a person skilled in the relevant field of technology using the basic concepts of the invention as defined in the following claims are also within the scope of a right of the invention.

REFERENCE SIGNS LIST 100, 200: laver snack
110: laver on the lower side (bottom laver)
120: edible adhesive
130: additive
140, 250: hemp oil
240: laver on the upper side (cover laver)
M100, M200: manufacturing apparatus of laver snack
M110: laver feeder on the lower side
M120: conveyor
M130: hopper for additives
M150, M260: first dryer
M160, M270: second dryer
M250: laver feeder on the upper side

What is claimed is:

1. A laver snack consisting of:
laver on the lower side forming a bottom;
an edible adhesive applied to the laver on the lower side;
an additive including hemp seed powder adhered to the edible adhesive; and
hemp oil applied on the edible adhesive and the additive,
wherein the edible adhesive is boiled by adding 250 g of grain flour to 1 liter of broth, the grain flour consisting of glutinous rice flour and brown rice flour in a ratio of 5:5.

2. The laver snack of claim 1, wherein the hemp oil is to be extracted at 40° C. or lower by cold pressed technique.

3. The laver snack of claim 2, wherein the hemp oil extracted from raw hemp seed by the cold pressed technique is used as the hemp oil without roasting the raw hemp seed.

4. A laver snack consisting of:
laver on the lower side forming a bottom;
an edible adhesive applied to the laver on the lower side;
an additive including hemp seed powder adhered to the edible adhesive;
hemp oil applied on the edible adhesive and the additive;
wherein the edible adhesive is boiled by adding 250 g of grain flour to 1 liter of broth, the grain flour consisting of glutinous rice flour and brown rice flour in a ratio of 5:5; and
laver on the upper side forming a top, wherein the hemp oil is applied on the laver on the upper side.

5. The laver snack of claim 4, wherein the hemp oil is to be extracted at 40° C. or lower by cold pressed technique.

6. The laver snack of claim 5, wherein the hemp oil extracted from raw hemp seed by the cold pressed technique is used as the hemp oil without roasting the raw hemp seed.

* * * * *